(12) United States Patent
Matsushima et al.

(10) Patent No.: US 8,044,117 B2
(45) Date of Patent: Oct. 25, 2011

(54) LATENT HARDENER, PROCESS FOR PRODUCING THE SAME, AND ADHESIVE CONTAINING LATENT HARDENER

(75) Inventors: Takayuki Matsushima, Tochigi (JP); Masao Saito, Tochigi (JP)

(73) Assignee: Sony Chemical and Information Device Corp., Tokyo (JP)

( * ) Notice: Subject to any disclaimer, the term of this patent is extended or adjusted under 35 U.S.C. 154(b) by 0 days.

(21) Appl. No.: 12/703,104

(22) Filed: Feb. 9, 2010

(65) Prior Publication Data

US 2010/0143604 A1   Jun. 10, 2010

Related U.S. Application Data

(62) Division of application No. 10/504,769, filed as application No. PCT/JP03/01592 on Feb. 14, 2003, now abandoned.

(30) Foreign Application Priority Data

Feb. 18, 2002   (JP) ............................... P2002-039748

(51) Int. Cl.
- *C08K 9/06* (2006.01)
- *C08K 5/24* (2006.01)
- *B32B 9/00* (2006.01)
- *B29C 65/00* (2006.01)

(52) U.S. Cl. ........ 523/212; 523/400; 427/458; 428/407; 156/60

(58) Field of Classification Search .................. 524/261; 252/506–508, 511; 427/384, 386, 458; 523/211–213, 216, 400, 457–460, 468; 428/402–403, 407; 156/60, 185, 283, 330
See application file for complete search history.

(56) References Cited

U.S. PATENT DOCUMENTS

| | | | | |
|---|---|---|---|---|
| 3,111,569 | A | * | 11/1963 | Rubenstein ................ 52/223.14 |
| 5,302,456 | A | * | 4/1994 | Matsui .......................... 428/407 |
| 6,042,894 | A | * | 3/2000 | Goto et al. .................... 427/504 |
| 6,224,947 | B1 | * | 5/2001 | Hall et al. ..................... 427/435 |
| 6,794,038 | B2 | * | 9/2004 | Matsushima ................ 428/407 |

OTHER PUBLICATIONS

Machine Translation of JP 2002-368047.*
Machine Translation of JP 05-086340.*
"Titanium chelate." [online] Material Data Safety Sheet, Microliink, Hubur group, 2008 [Retrieved Jun. 8, 2011] Retrieved on the Internet <URL:http://www.microlink.com/images/pdf20%of20api-002/MSDS%20Adhesion%20Promoter20API%20.pdf>.*

* cited by examiner

*Primary Examiner* — Vasu Jagannathan
*Assistant Examiner* — Hannah Pak
(74) *Attorney, Agent, or Firm* — Osha • Liang LLP

(57) ABSTRACT

A latent curing agent (30) of the present invention includes a core member (31) and a capsule (37) covering up the surface of the core member (31). The core member (31) includes a secondary particle (32) and a curing agent (35) retained in a gap (38) of the secondary particle (32). The curing agent (35) is liquid at ambient temperature. When the capsule (37) is destructed so that the curing agent (35) is emitted into an adhesive, the curing agent (35) is mixed with other ingredients in the adhesive. A metal alcoholate which is liquid at ambient temperature or a metal chelate which is liquid at ambient temperature is used as the curing agent (35), while a silane coupling agent is added to the adhesive. A reaction takes place between the curing agent (35) and the silane coupling agent to yield cations. By these cations, the epoxy resin undergoes cation in polymerization. Since the cation generating reaction proceeds at a temperature lower than in the case of the conventional adhesive, curing proceeds more promptly and at a lower temperature than in the case of the conventional adhesive.

9 Claims, 9 Drawing Sheets

LATENT HARDENER, PROCESS FOR PRODUCING THE SAME, AND ADHESIVE CONTAINING LATENT HARDENER

TECHNICAL FIELD

This invention relates to an adhesive and, more particularly, to a latent curing agent, used in an adhesive, used in turn for electrically and further mechanically thermo-compression bonding a semiconductor chip or a TCP (tape carrier package) to a substrate, a manufacturing method for the latent curing agent, and to an adhesive employing this curing agent.

This application is a divisional of U.S. patent application Ser. No. 10/504,769 filed Aug. 17, 2004 now abandoned, which is a §371 application of PCT Application No. PCT/JP03/01592 filed Feb. 14, 2003, which claims priority of Japanese Patent Application No. 2002-039748, filed in Japan on Feb. 18, 2002, the entirety of which is incorporated by reference herein.

BACKGROUND ART

Up to now, an adhesive containing an epoxy resin, as a thermosetting resin, has been used for connecting a semiconductor chip to a substrate, and for connecting a TCP (tape carrier package) to an LCD (liquid crystal display) to manufacture an electrical appliance. This adhesive is cured by thermal polymerization of an epoxy resin.

For accelerating the thermal polymerization reaction, a latent curing agent is added to the adhesive. This sort of the latent curing agent is shown in FIG. 1. A latent curing agent 130, shown in FIG. 1, includes a core member 131 formed by a particulate curing agent (a fine particle of a curing agent) and a capsule 137 which covers up the surface of the core member 131. When the latent curing agent is mixed with an epoxy resin to prepare an adhesive, the curing agent, which forms the core member 131, and the epoxy resin in the adhesive, are separated from each other by the capsule 137, at ambient temperature, so that there occurs no polymerization reaction of the epoxy resin. The capsule 137 is formed by a thermoplastic resin, such as urethane resin, and, if the adhesive is heated to a temperature higher than a predetermined temperature, the capsule 137 is fused or destroyed by thermal deformation, so that the core member 131 is ejected into the adhesive. When the adhesive is continuously heated in this state, the polymerization reaction of the epoxy resin proceeds rapidly, by the curing agent forming the core member 131, thus curing the adhesive.

By using the above-described latent curing agent 130, it is possible to produce an adhesive which is superior in preservability on storage at ambient temperature and which exhibits a high curing performance on heating.

However, the above-described particulate curing agent is more difficult to undergo dispersion into an adhesive than the liquid curing agent, such that the polymerization reaction of the epoxy resin proceeds more slowly than in case of using a liquid curing agent.

As the curing agent, forming the core member 131, a modified amine compound, for example, is generally employed. However, in polymerizing the epoxy resin using such curing agent, the adhesive needs to be heated to equal to or higher than 180° C., such that there is a risk of thermal deformation of the components to be bonded together. Although this problem may be overcome by using a lower heating temperature, the time needed for heating processing is prolonged, thus worsening the productivity.

DISCLOSURE OF THE INVENTION

It is therefore an object of the present invention to provide a latent curing agent capable of overcoming the problems inherent in the above-described conventional adhesive, a manufacturing method for the latent curing agent, and an adhesive employing the latent curing agent.

It is another object of the present invention to provide an adhesive superior in preservability and which may be cured under a condition of a low curing temperature and short curing time.

For accomplishing the above object, the present invention provides a latent curing agent comprising a core member containing a curing agent, and a capsule which covers up the core member, the curing agent being emitted to outside from the core member on destruction of the capsule, wherein the core member has a plurality of particles and the curing agent is retained between gaps of the particles.

A plural number of particles, used in this latent curing agent, coalesce together to form a secondary particle. Preferably, the particles making up this secondary particle has the average particle size of equal to or greater than 0.1 µm and equal to or less than 1.0 µm and the average particle size of the secondary particle is equal to or greater than 1 µm and equal to or less than 20 µm.

Preferably, each particle forming the secondary particle is a latent curing agent composed of a resin particle. The resin making up the resin particles is a urea formalin resin.

Preferably, the weight of the curing agent retained in the capsule is equal to or greater than 15 wt % of the weight of the secondary particle.

The present invention also provides a latent curing agent comprising a core member containing a curing agent and a capsule which covers up the core member, the curing agent being emitted to outside from the core member on destruction of the capsule, wherein the core member has a porous particle and the curing agent is retained in the porous particle. The porous particle may be formed of zeolite.

Preferably, the weight of the curing agent retained in the capsule is equal to or greater than 15 wt % of the weight of the porous particle.

In the second stated latent curing agent according to the present invention, the curing agent is one or both of a metal chelate and a metal alcoholate. The metal chelate is one or both of an aluminum chelate and a titanium chelate. The metal alcoholate is one or both of an aluminum alcoholate or a titanium alcoholate as main ingredients.

The present invention also provides a method for the preparation of a latent curing agent comprising a mixing step of mixing a carrier having a gap in its inner structure and a liquid curing agent to form a core member made up by the carrier and the curing agent retained in the carrier, a depositing step of mixing the core member and a capsule resin particle to cause the capsule resin particle to be deposited on the surface of the core member, and a fusing step of fusing the capsule resin particle, deposited to the core member, to form a capsule covering up the surface of the core member.

The method for the preparation of a latent curing agent according to the present invention includes a rinsing step of rinsing the carrier after the mixing step.

The present invention also provides an adhesive comprising a thermosetting resin, a silane coupling agent and a latent curing agent comprising a core member containing a curing agent, and a capsule which covers up the core member, the curing agent being emitted to outside from the core member on destruction of the capsule, the core member having a plurality of particles and the curing agent is retained between gaps of the particles.

According to the present invention, when the carrier having a gap in its inner structure and a curing agent which is liquid at ambient temperature are mixed together, the curing agent, contacted with the carrier surface, is intruded by a capillary action into the gaps in the carrier. The curing agent, thus intruded into the gaps, is retained in the carrier by the capillary force of attraction. Meanwhile, the gaps denote both the interstices between the particles, coalescing together, and fine pores in the inner structure in the porous particle.

If the metal alcoholate or a metal chelate, liquid at ambient temperature, is used as a curing agent, and a silane compound having an alkoxy group (silane coupling agent) is added to the adhesive, silanol, yielded by hydrolysis of a silane compound (silane coupling agent), reacts with the metal chelate or metal alcoholate to yield cations. By these cations, the epoxy resin is able to undergo cationic polymerization.

The process of polymerization of the epoxy resin with the adhesive employing the aluminum chelate as the curing agent is now explained with reference to the following reactions (1) to (4):

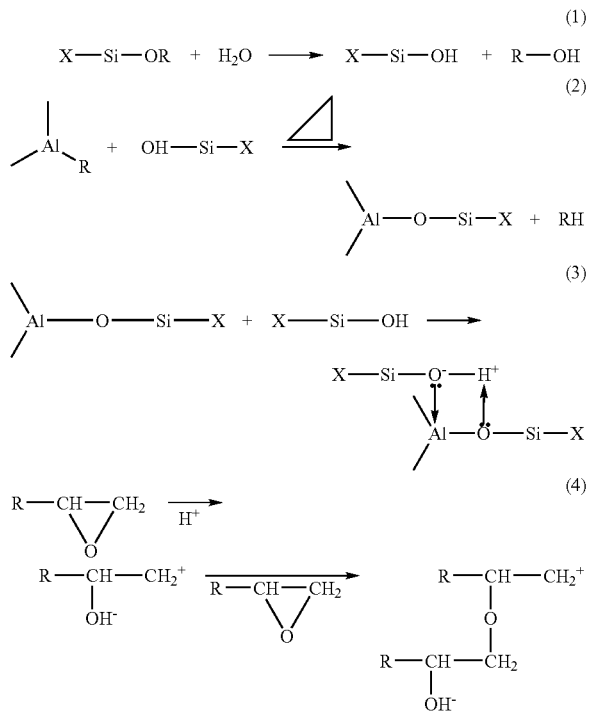

In the reaction formula (1), there is shown one alkoxy group of the silane compound. The silane compound reacts with water in the adhesive and, by the hydrolysis, the alkoxy group is turned into a silanol group. On heating the adhesive, the silanol group reacts with an aluminum chelate. The silane compound is linked to the aluminum chelate (reaction formula (2)).

To an aluminum chelate, linked to the silanol group, another silanol group left in the adhesive is coordinated by an equilibrium reaction, whereby a Brensted melting point, indicated by the right side of the reaction formula (3), is produced to yield an activated proton.

The epoxy ring, located at a terminal end of the epoxy group, undergoes a ring-opening reaction by the proton, as indicated by the left hand side of the reaction formula (4), and is polymerized with another epoxy ring of the epoxy resin (cationic polymerization).

Since the reaction shown by the reaction formulas (2) and (3) proceeds at a temperature lower than the curing temperature of the conventional adhesive (180° C. or higher), the above-described adhesive is cured at a lower temperature in a shorter time than the conventional adhesive.

When the metal chelate or the metal alcoholate is used as the curing agent, and zeolite is used as a particle having plural gaps, the silanol group, exposed on the zeolite surface, reacts with the curing agent to yield cations. However, the cations are shielded by the capsule from the epoxy resin in the adhesive, and hence the polymerization reaction of the epoxy resin does not proceed at ambient temperature.

For the encapsulating process, a hybridizer device, for example, [NHS-0], a trade name of a product manufactured by NARA KIKAI SEISAKU-SHO KK. In this case, the mixing ratio of the core member and the capsule resin particle for mixing may be found from the following equation (1):

$$M/m = D \times F/(4 \times d \times f) \qquad \text{Equation (1)}$$

where M, m, D, d, F and f denote the amount (g) of the core member, the amount (g) of the capsule resin particles, the average particle size (μm) of the core member, the average particle size (μm) of the capsule resin particle, the specific gravity of the core member and the specific gravity of the capsule resin particle, respectively. Meanwhile, the specific gravity herein means the density ratio of a material in question to the density of water at 4° C. as a standard reference material. The above equation (1) is a theoretical one such that the optimum mixing proportions of the core member and the capsule resin particle are determined case-by-case.

Addition of the thermoplastic resin to the adhesive increases the adhesive power of the adhesive, since the force of flocculation of the adhesive is increased due to the properties of the thermoplastic resin. If the thermoplastic resin of a higher polarity is used, not only is the thermoplastic resin involved in the curing reaction of the resin components, but the thermoplastic resin is bonded to the inorganic material through the silane coupling agent, so that such an adhesive may be produced which is high in curing performance and in affinity to a subject of bonding formed of an inorganic material.

Other objects, features and specific advantages of the present invention will become more apparent from reading the embodiments of the present invention as shown in the drawings.

BEST MODE FOR CARRYING OUT THE INVENTION

A latent curing agent according to the present invention is hereinafter explained.

Figure 1:
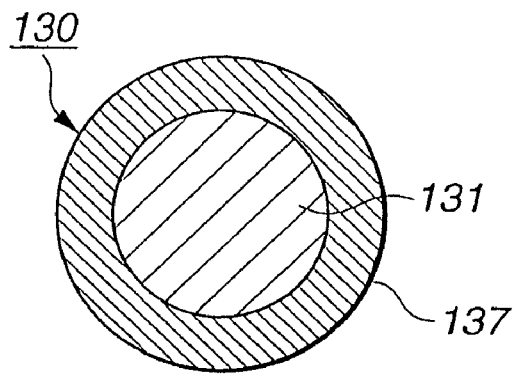
FIG. 1 is a cross-sectional view showing a latent curing agent used conventionally.
Figure 2:
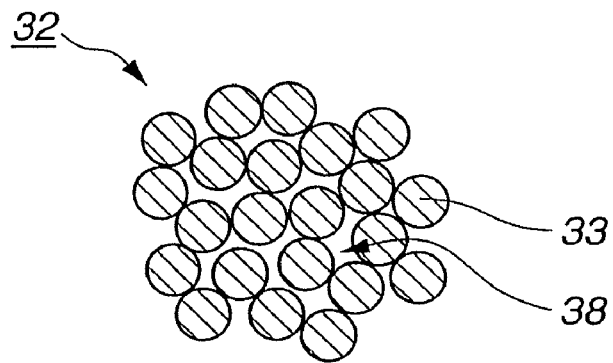
FIG. 2 is a cross-sectional view showing a secondary particle forming a latent curing agent according to the present invention and FIG. 3 is a cross-sectional view showing the state in which a secondary particle has been impregnated with a curing agent.

Referring to FIG. 2, the latent curing agent of the present invention includes a plural number of resin particles 33, having an average particle size equal to or greater than 0.1 μm and equal to or less than 1.0 μm. These plural resin particles 33 are bonded to one another to form a unitary mass to constitute a secondary particle 32 having an average particle size equal to or greater than 1 μm and equal to or less than 20 μm. A gap 38 is formed between the plural resin particles 33 which form the unitary mass.

Figure 3:
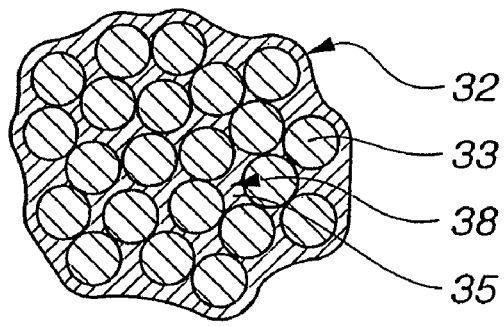

For the preparation of the latent curing agent according to the present invention, a curing agent 35, made up by a metal chelate, which is liquid at ambient temperature, a metal alcoholate, which is liquid at ambient temperature, or a mixture thereof, is formed, and the secondary particle 32 is immersed in the curing agent 35. When the secondary particle 32 is immersed in the curing agent 35, the curing agent 35, contacted with the secondary particles 32, is intruded into a plural number of the gaps 38 by a capillary phenomenon. The result is that the curing agent 35 is impregnated in the secondary particle 32, as shown in FIG. 3. When the secondary particle 32 has been impregnated with a sufficient quantity of the curing agent 35, the secondary particle 32 is uplifted from the curing agent 35.

Figure 4:
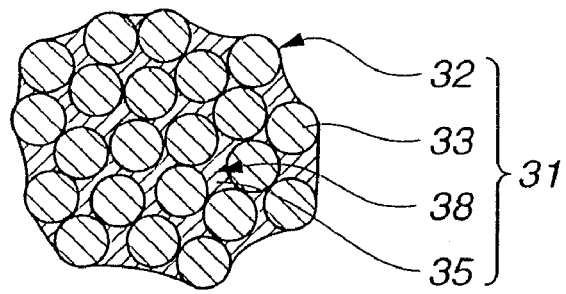
FIG. 4 is a cross-sectional view showing a core member forming a latent curing agent according to the present invention.

When the secondary particle 32 has been immersed in the curing agent 35 until sufficient impregnation of the curing agent 35 therein, and subsequently uplifted, an excess quantity of the curing agent 35 is affixed to the surface of the secondary particle 32. The secondary particle 32, to which the excess quantity of the curing agent 35 has become attached, as shown in FIG. 3, is rinsed and dried in its entirety to remove the curing agent 35 affixed to its surface. On the other hand, the curing agent 35 which has intruded into the gaps 38 is left as it is held within the secondary particle 32, as shown in FIG. 4. The secondary particle 32, which has retained the curing agent 35 in the gaps 38, constitutes a core member 31 of the latent curing agent according to the present invention.

Figure 5:
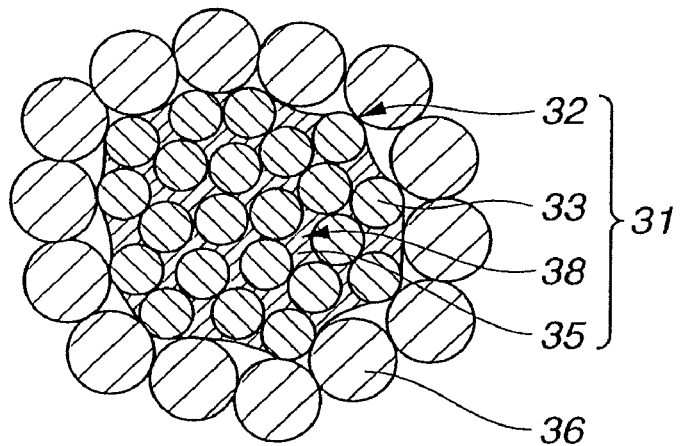
FIG. 5 is a cross-sectional view showing the state in which a capsule resin particle has been electro-statically deposited on the surface of the core member.

Next, a particulate resin having an average particle size smaller than the particle size of the core member 31, such as a capsule resin particle 36 of, for example, fluorine resin, is provided. Then, in a mixing step, the capsule resin particle 36 is mixed with the core member 31, which is in the state shown in FIG. 4, and stirred in a mixer. This electro-statically deposits the capsule resin particle 36 on the surface of the core member 31. At this time, the surface of the core member 31 is covered up by a large number of the capsule resin particles 36, as shown in FIG. 5.

Figure 6:
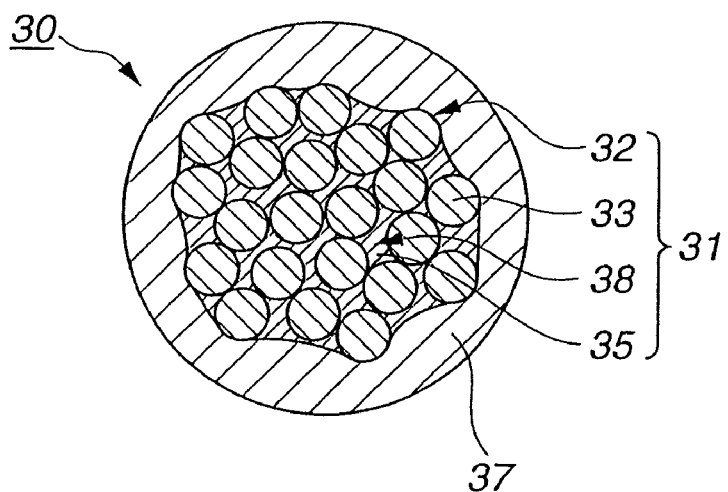
FIG. 6 is a cross-sectional view showing the state in which the core member has been covered up with the capsule.

Then, in the stirring step, the core member 31, having the capsule resin particles 36 affixed thereto, is charged into a stirrer and stirred at a high speed. The capsule resin particles 36, which cover up the surface of the core member 31, are fused, as a result of collision against the capsule resin particles 36, which cover up the surface of a neighboring core member(s) 31, rotary blades of the stirrer, or against the inner wall of the stirrer. The capsule resin particles 36, thus fused, are unified together on the surface of the core member 31, as shown in FIG. 6. The capsule resin particles 36, thus unified together by surface fusion of the core member 31, form a capsule 37 of the latent curing agent according to the present invention.

The latent curing agent, prepared by the above process, according to the present invention, has a structure in which the secondary particle 32, into the gaps 38 of which has been intruded the curing agent 35, is covered up by the capsule 37, as shown in FIG. 6.

The adhesive employing the latent curing agent according to the present invention, and the process of producing an electrical appliance using this adhesive, are hereinafter explained.

The adhesive, employing the latent curing agent according to the present invention, is manufactured by mixing and stirring the latent curing agent, manufactured by the above process, an epoxy resin, as a thermosetting resin, that is yet to be cured, a silane coupling agent, an electrically conductive particle, and an organic solvent. The adhesive, thus prepared, is in a paste-like state.

Figure 7:
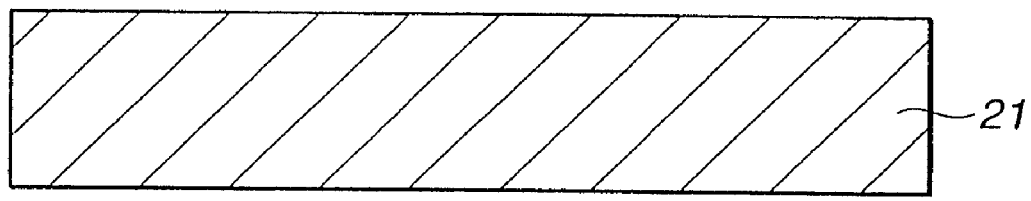
FIG. 7 is a cross-sectional view showing a release film which, on being coated with the adhesive of the present invention, will form an adhesive film.
Figure 8:
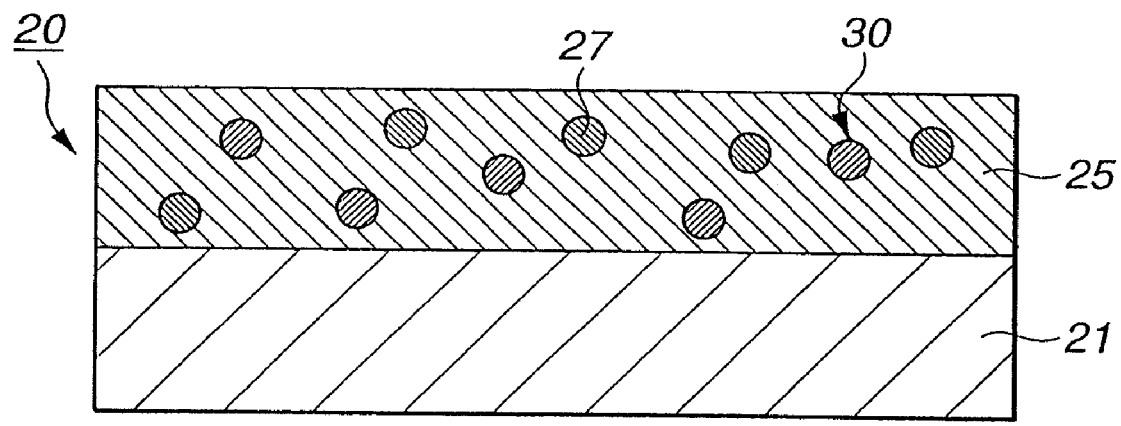
FIG. 8 is a cross-sectional view showing an adhesive film obtained on coating an adhesive on the surface of the release film.

A predetermined amount of the paste-like adhesive, containing the latent curing agent, is coated on the surface of a release film 21, as shown in FIG. 7. The adhesive, thus coated on the release film 21, is then dried to form a coating layer 25, from which the solvent has been vaporized off, as shown in FIG. 8. The release film 21, having formed thereon the coating layer 25, composed of the adhesive, forms an adhesive film 20, composed of the release film to which has been unified the coating layer 25 as the adhesive.

In the adhesive, coated on the release film 21, there are contained a number of particles of the curing agent 30 and electrically conductive particles 27. Thus, the electrically conductive particles 27 are dispersed and mixed, along with the particles of the curing agent 30, in the coating layer 25, obtained on drying the adhesive coated on the release film 21, as shown in FIG. 8.

With the curing agent 35, contained in the coating layer 25, which has been formed on coating the release film 21 with the adhesive, the polymerization reaction of the epoxy resin is suppressed, because the curing agent is shielded from the silane coupling agent in the adhesive by the capsule 37. Thus, the coating layer 25 is kept in a non-cured state.

The subject of bonding, obtained with the use of the latent curing agent according to the present invention, is now explained.

The subject of bonding, which may be bonded using the adhesive of the present invention, may be enumerated by an LCD (liquid crystal display) 11 and a TCP (tape carrier package) 15 bonded to this LCD. The LCD and the TCP are bonded together to form a predetermined electrical appliance.

Figure 9:
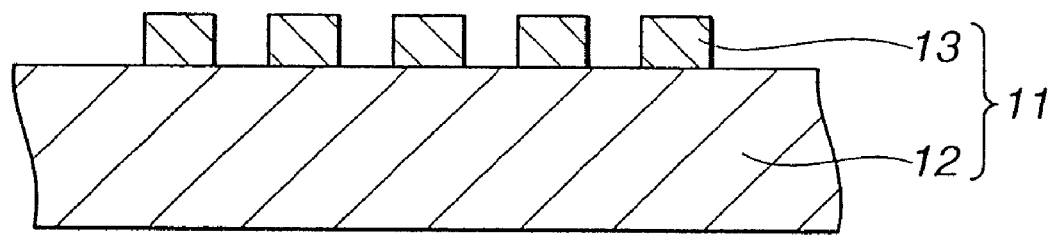
FIG. 9 is a cross-sectional view showing an LCD as a subject of bonding.
Figure 10:
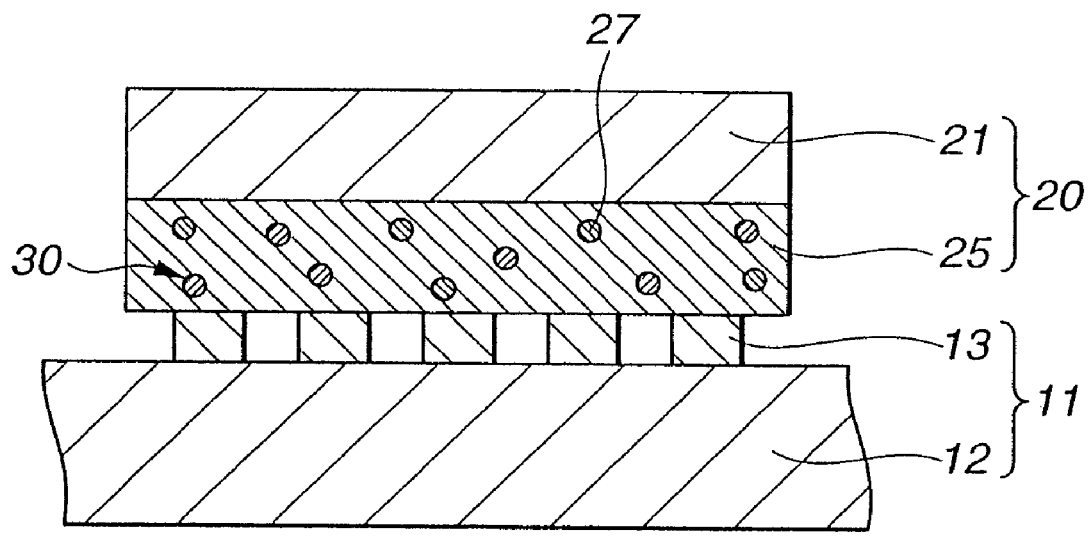
FIG. 10 is a cross-sectional view showing the state in which the adhesive film is arranged on the LCD surface.

The LCD 11, as one subject of bonding, includes a glass substrate 12, and a plural number of electrodes 13 on the surface of the glass substrate 12, as shown in FIG. 9. In the embodiment shown in FIG. 9, five electrodes 13 are used. On the portion of the surface of the LCD 11, carrying the electrodes 13, and to which is bonded the TCP 15, there is arranged an adhesive film 20 shown in FIG. 8. The adhesive film 20 is applied such that the coating layer 25 is superposed on the electrodes 13, as shown in FIG. 10. The adhesive film 20 is mounted on the LCD 11 so that the coating layer 25 is pressed against the electrodes 13.

Figure 11:
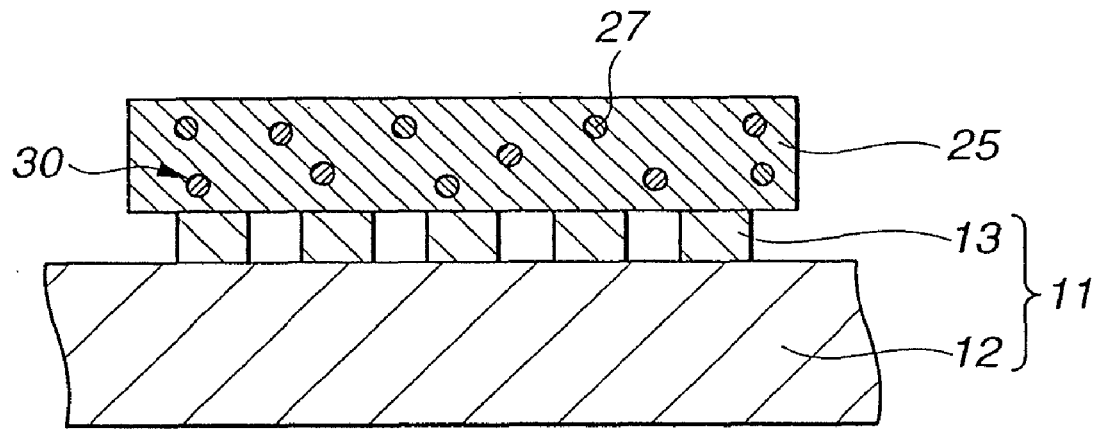
FIG. 11 is a cross-sectional view showing the state in which the release film of the adhesive film arranged on the LCD has been peeled off.

Meanwhile, the adhesive force between the release film 21 of the adhesive film 20 and the coating layer 25 is set so as to be smaller than the adhesive force between the coating layer 25 and the electrodes 13 of the LCD 11. Thus, only the release film 21 can be peeled off, as the coating layer 25 is left on the LCD 11, as shown in FIG. 11, so that only the coating layer 25 can be left on the electrodes 13.

Figure 12:
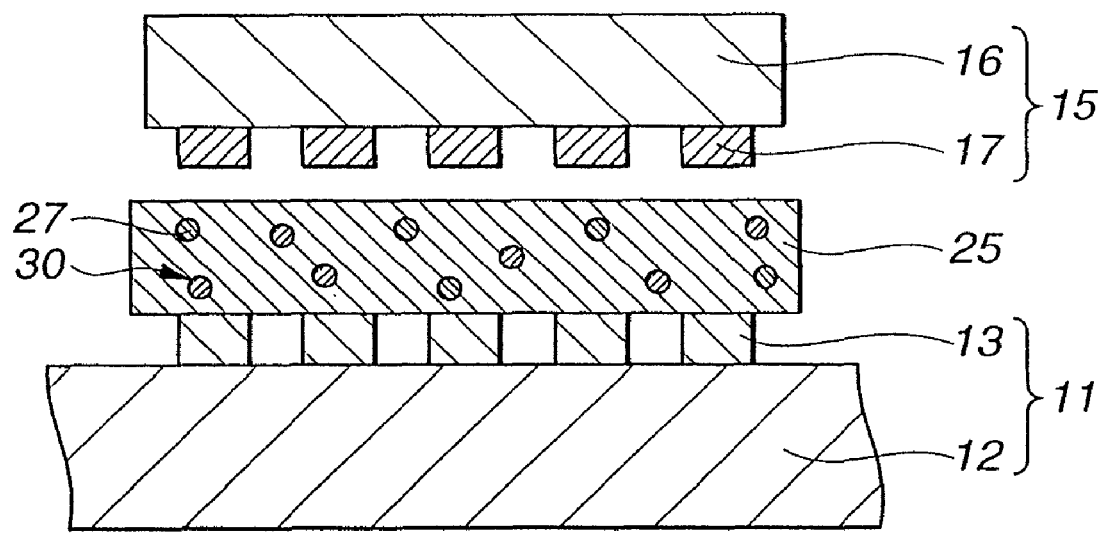
FIG. 12 is a cross-sectional view showing the state in which a TCP as another subject of bonding has been arranged on a coating layer deposited on the LCD.

The TCP 15, bonded to the LCD 11, has a base film 16, as shown in FIG. 12, and a number of metal wires 17 is provided to one surface of the base film 16. In the embodiment of FIG. 12, five of the metal wires 17 are used.

The TCP 15, bonded to the LCD 11, is arranged with the metal wires 17 facing the surface of the LCD 11 carrying the electrodes 13, as shown in FIG. 12. The metal wires 17 of the TCP 15 and the respective electrodes 13 of the LCD 11 are abutted at this time in a facing relationship to one another, as shown in FIG. 13.

Figure 13:
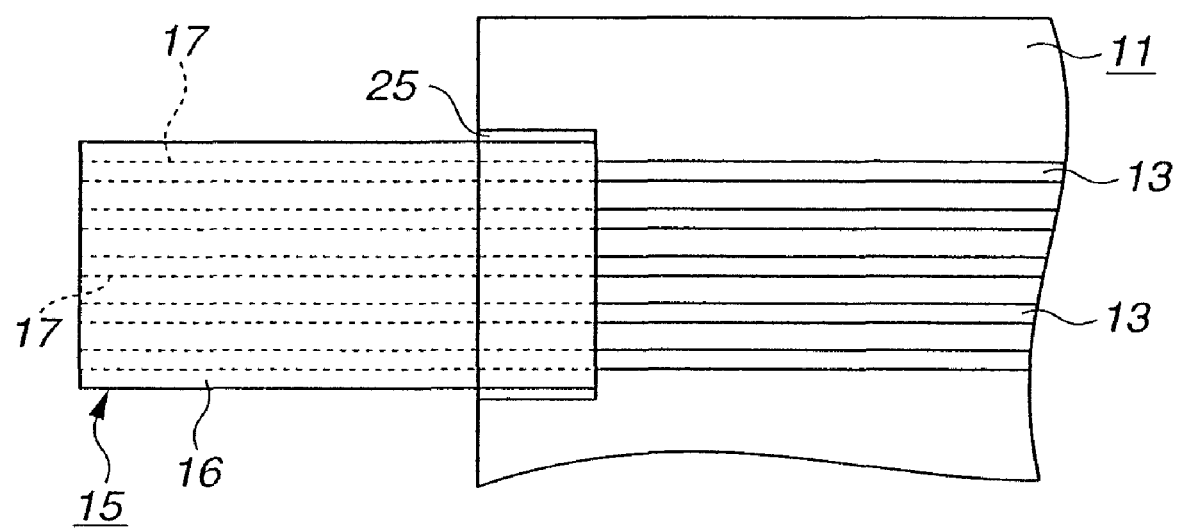
FIG. 13 is a plan view showing the state in which the TCP has been abutted on the LCD.

The TCP 15 and the LCD 11 are rectangular in planar configuration, as shown in FIG. 13. The electrodes 13 provided to the LCD 11 and the metal wires 17 provided to the TCP 15 are elongated and formed parallel to each other.

The LCD 11 and the TCP 15, arranged parallel to each other with the surface carrying the electrodes 13 and the surface carrying the metal wires 17 facing each other, are arranged facing each other so that the direction of extension of the electrodes 13 of the LCD 11 is opposite to that of the metal wires 17, with the one ends of the electrodes 13 partially overlapping with the one ends of the metal wires 17, as shown in FIG. 13. That is, the TCP 15 and the LCD 11 are adapted to face in a partially overlapped relationship to each other.

Figure 14:
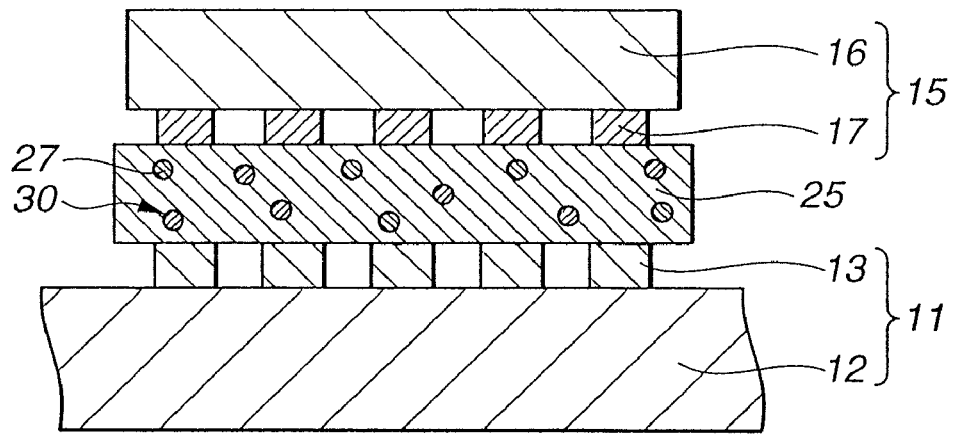
FIG. 14 is a cross-sectional view showing the state in which the TCP has been abutted on the LCD.
Figure 15:
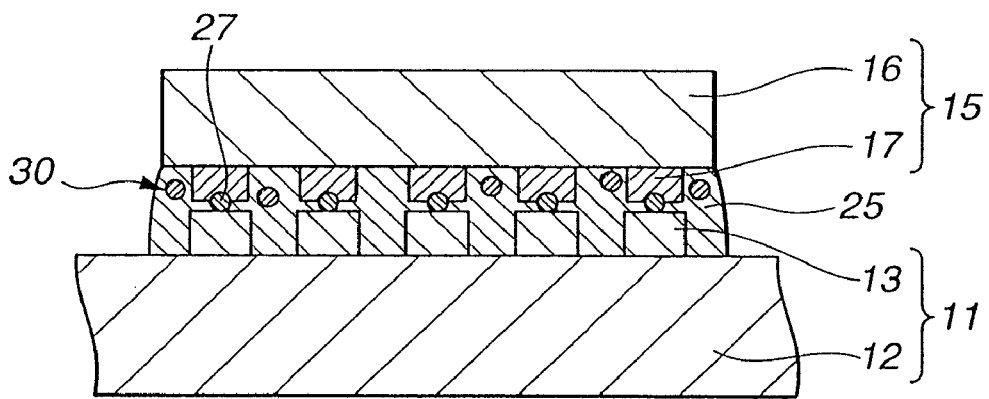
FIG. 15 is a cross-sectional view showing the state in which a TCP side metal wiring has been embedded in a coating layer.

The TCP 15 is abutted against the coating layer 25, arranged on the LCD 11, as the one ends of the electrodes 13 are partially overlapped with the one ends of the metal wires 17, as shown in FIG. 14. When the overlapping portions of the TCP 15 and the TCP 11 are pressed together and heated in their entirety, the coating layer 25 is softened on heating, and the metal wires 17 are pushed into the softened coating layer 25, as shown in FIG. 15. In this case, the electrically conductive particle 27 in the coating layer 25 is interposed between the metal wire 17 and the electrode 13, as shown in FIG. 15.

When the pressing of the TCP 15 towards the LCD 11 and the heating of the overall assembly are continued, the capsule 37, forming the latent curing agent 30 of the present invention, is destroyed, due to expansion on heating and physical impact due to thrusting. This releases the curing agent 35, held in the gap 38 of the secondary particle 32, covered up by the capsule 37, into the coating layer 25. The curing agent 35, released from the capsule 37, reacts with the silane coupling agent in the coating layer 25 to release a cation into the coating layer 25. When the cation is released into the coating layer 25, the epoxy resin, as a thermosetting resin, undergoes polymerization (cationic polymerization) by the cation to cure the coating layer 25. The coating layer 25 is cured at this time, as the electrically conductive particle 27 is sandwiched between the metal wire 17 on the side of the TCP 15 and the electrode 13 on the side of the LCD 11, as shown in FIG. 16.

Figure 16:
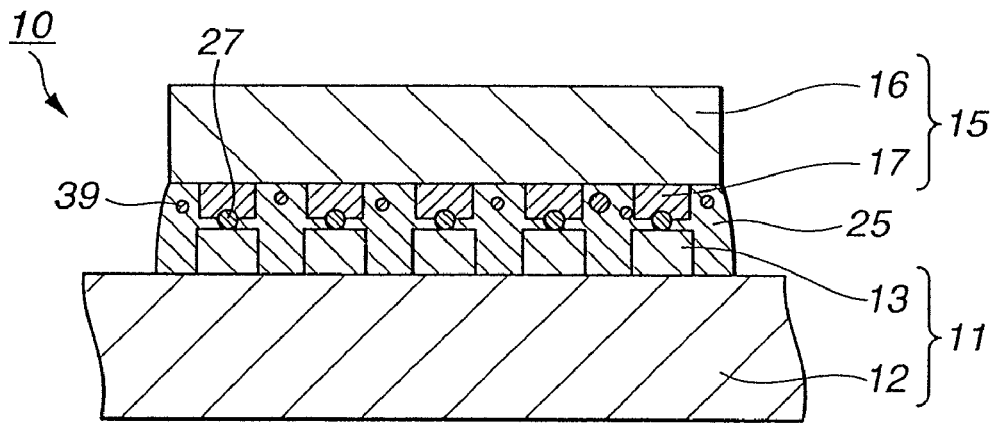
FIG. 16 is a cross-sectional view showing the state in which the coating layer has been fused and solidified to bond the LCD and the TCP together.

By the curing of the coating layer 25, interposed between the TCP 15 and the LCD 11, the TCP 15 is bonded to the LCD 11, to form an electrical appliance 10 shown in FIG. 16. With the so formed electrical appliance 10, shown in FIG. 16, the TPC 15 and the LCD 11 are mechanically bonded together by the cured coating layer 25, while the metal wire 17 of the TCP 15 and the electrode 13 of the LCD 11 are electrically connected to each other via the electrically conductive particle 27 contained in the coating layer 25.

Thus, the adhesive of the present invention is not only superior in preservability but the epoxy resin can be cured at a lower temperature and in a shorter time than when the conventional curing agent is used, because the epoxy resin is cured by cationic polymerization.

EXAMPLES

Specified examples of the latent curing agent, according to the present invention, and the adhesive film as the adhesive of the present invention, employing this curing agent, are hereinafter explained.

For manufacturing the latent curing agent according to the present invention, ethyl acetate aluminum diisopropylate, as a metal chelate, which is liquid at ambient temperature (manufactured by Kawaken Fine Chemical KK. under the trade name of [ALCH]), is provided as a curing agent. The secondary particle 32, obtained on flocculation of urea formalin resin particles 33, is immersed in the so prepared curing agent, and the resulting mass is allowed to stand in vacuum atmosphere for 24 hours, thereby impregnating the secondary particle 32 with the curing agent.

The curing agent is filtered for separating the secondary particle 32. The so separated secondary particle 32 is rinsed and dried to yield the aforementioned core member 31 in the state shown in FIG. 4. The weight of the curing agent, contained in the core member 31 in the state, was 200 wt % of the weight of the secondary particle 32, that is twice the weight of the secondary particle 32.

Using a device (Hybridizer NHS-0) (trade name of a product manufactured by NARA KIKAI SEISAKU-SHO KK), as a hydridizer device, the core member 31, shown in FIG. 4, and a capsule resin particle 36, as a particulate fluorine resin Luburon L-5 (trade name of a product manufactured by DAIKIN KOGYO KK; primary particle size of 0.2 μm and melting point of 327° C.) were mixed and stirred to form the capsule 37 to yield the latent curing agent 30. The driving conditions for the hybridizer device were the rpm of 16200 (peripheral speed 100 m/s) and the processing time of five minutes.

To 50 parts by weight of Bisphenol A epoxy resin (manufactured by YUKA SHELL EPOXY KK. under a trade name of [EP828]), as a thermosetting resin, 50 parts by weight of a phenoxy resin (manufactured by TOTO KASEI KK, under a trade name of [YP50]), as a thermoplastic resin, 1 part by weight of an epoxy resin coupling agent (manufactured by NIPPON UNICAR KK. under a trade name of [A-187], 2.5 parts by weight of the electrically conductive particles and 2 parts by weight of the latent curing agent 30, were added and mixed together to form an adhesive. Using this adhesive, the adhesive film 20 of the present embodiment was prepared by the above-described process steps shown in FIGS. 7 and 8.

The [ambient temperature preservation test] and [40° C. preservation test] were then conducted, using the adhesive film 20 of the present embodiment.

Ambient Temperature Preservation Test

The TCP 15 and the LCD 11 were bonded together, by the process shown in FIGS. 9 to 16, as described above, using the adhesive film 20 of the present embodiment, and subsequently the peel-off strength in peeling off the TCP 15 from the LCD 11 was measured (initial peel-off strength). Specifically, the TCP 15 carrying metal wires 17 of 25 μm in width, at an interval of 25 μm, and the LCD 11, carrying an ITO electrode 13, with a sheet resistance per 1 cm² of the surface area of 10Ω, were used. As a load of 3 MPa was applied to the overlapping portions of the TCP 15 and the LCD 11, the TCP 15 and the LCD 11 were heated for ten seconds, and the coating layer 25 was heated to 130° C. for bonding.

The adhesive film 20 of the present embodiment was preserved at room temperature for one day, three days and seven days and, using the respective adhesive films 20, the TCP 15 and the LCD 11 were bonded together by the process similar to the above-described process and subsequently the TCP 15 was peeled off from the LCD 11 to measure the peel-off strength (post-preservation peel-off strength).

40° C. Peel-Off Test

The adhesive film 20 of the present embodiment was preserved under the same conditions as those of the above-described [ambient temperature preservation test] except changing the preservation temperature from the ambient temperature to 40° C., and was used for bonding the TCP 15 and the LCD 11. The post-preservation peel-off strength was then measured of the adhesive film.

In the [ambient temperature preservation test] and the [40° C. peel-off test], the cases of the post-preservation peel-off strength being equal to or greater than 90% of the initial peel-off strength, equal to or greater than 80% and less than 90%, equal to or greater than 70% and less than 80% and less than 70%, are labeled ⊚, ○, Δ and ×, respectively, for evaluation. The results of the evaluation are as indicated in the following Table 1.

TABLE 1

Results of Evaluation Test

| | preservation at room temperature | | | preservation at 40° C. | | |
|---|---|---|---|---|---|---|
| | 1 day | 3 days | 7 days | 1 day | 3 days | 7 days |
| Test Ex. 1 | ⊚ | ⊚ | ⊚ | ⊚ | ⊚ | ○ |
| Test Ex. 2 | X | X | X | X | X | X |

Meanwhile, the Comparative Example in the above Table 1 indicates an example in which the curing agent used in the Example was directly added to the adhesive in place of the above-described latent curing agent 30.

As may be apparent from the above Table 1, the adhesive film 20, obtained on impregnating the core member 31 with the curing agent 35 and covering up the resulting mass with the capsule 37, was found to exhibit high peel-off strength after preservation under the conditions of the ambient temperature and 40° C. The magnitude of the peel-off strength following the preservation tests is a measure of the preservation performance of the adhesive and demonstrates the high preservability of the adhesive of the present embodiment.

On the other hand, in the Comparative Example where the curing agent is directly added to the adhesive, it was confirmed that the peel-off strength in any of the preservation tests was low and that the adhesive is inferior in preservability.

In the above Examples, urea formalin resin particles are used as the resin particles 33 forming the secondary particle 32. The present invention is, however, not limited to this configuration. A large variety of resin particles, other than the urea formalin resin particles, such as particles of acrylic resin, may, for example, be used. The resin particles 33, forming the secondary particle 32, are desirably chemically inert against the curing agent 35.

In the above-described Example, the secondary particle 32 is used as the core member 31. However, the present embodiment is not limited to this specific embodiment.

Figure 17:
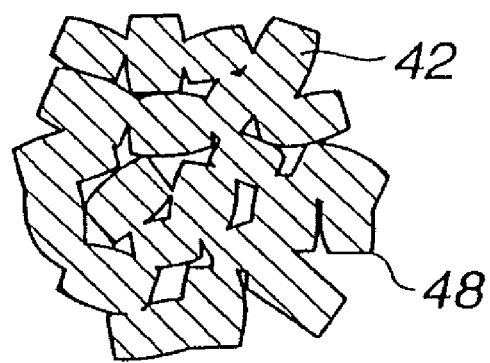
FIG. 17 is a cross-sectional view showing a porous particle employed in place of the secondary particle.
Figure 18:
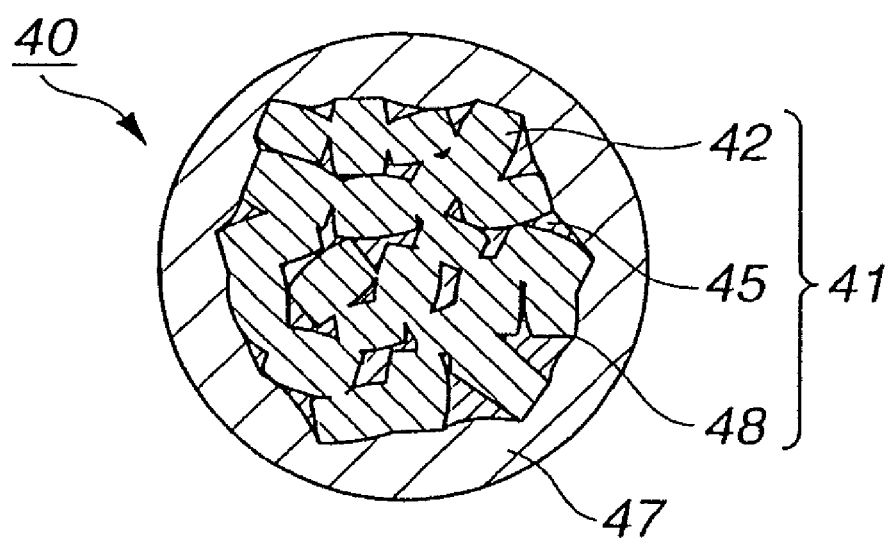
FIG. 18 is a cross-sectional view showing a core member employing a porous particle.
Figure 19:
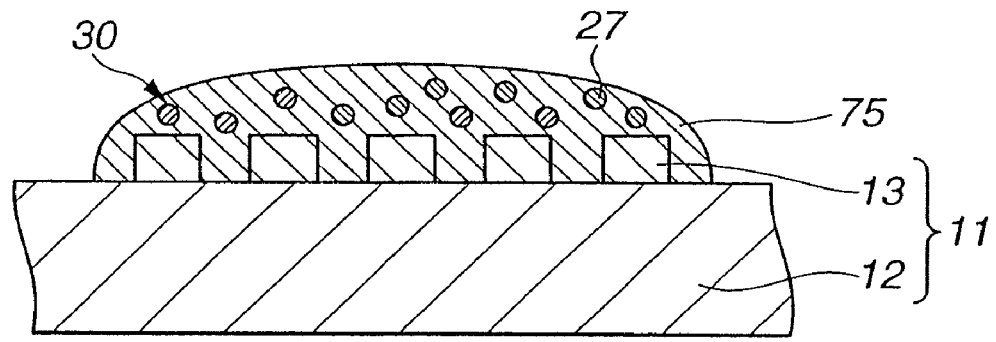
FIG. 19 is a cross-sectional view showing another example of an adhesive according to the present invention.

A modification of the present invention is hereinafter explained. This embodiment uses a porous particle 42, shown in FIG. 17, in place of the secondary particle 32. The porous particle 42 has fine pores 48, that is, a minute-sized gap, in its inside, as shown in FIG. 17. When this porous particle 42 is used, as when using the secondary particle 32, a latent curing agent 40, shown in FIG. 18, may be obtained by forming a core member 41 having the sole porous particle 42 by the process shown in FIGS. 3 and 4, and by forming a capsule 47 by the process shown in FIGS. 5 and 6, using the core member 41. Meanwhile, a curing agent 45 is impregnated and retained in the pores 48 in the porous particle 42.

As the porous particle 42, a fine particle of zeolite or starch may be used. As the zeolite, the product manufactured by NIPPON KAGAKU KOGYO KK. under a trade name of [Zeoster], in which the moisture adsorbing capability (moisture absorbing quantity) on allowing to stand under a condition of relative humidity of 10% is equal to or greater than 18 wt % of the own weight and the moisture adsorbing capability (moisture absorbing quantity) on allowing to stand under a condition of relative humidity of 60% is equal to or greater than 20 wt % of the own weight, may be used.

In the above explanation, the adhesive film is formed using the adhesive. The present invention is, however, not limited to this embodiment, such that the adhesive may be used in its original form of a paste.

When the adhesive is used in the original form of the paste to bond the TCP 15 to the LCD 11, the adhesive of the present invention is applied to the portion of the surface of the LCD 11, carrying the electrodes 13, and to which the TCP 15 is bonded, to form an adhesive coating layer 75.

Figure 20:
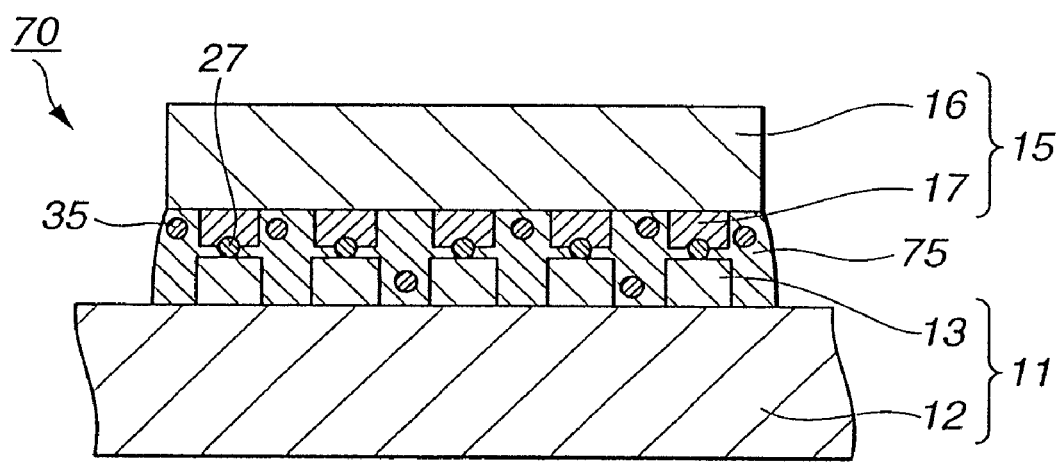
FIG. 20 is a cross-sectional view showing the state in which the LCD and the TCP have been bonded together using another instance of the adhesive according to the present invention.

Then, as in the process shown in FIG. 12, the LCD 11 and the TCP 15 are caused to face each other by position registration of the metal wiring 17 of the TCP 15 with respect to the electrode 13 of the LCD 11. The TCP 15 and the LCD 11 are bonded to each other through a process similar to the step of FIGS. 14 to 16 to yield an electrical appliance shown in FIG. 20.

In the foregoing, the TCP 15 and the LCD 11 are bonded to each other using the adhesive. The present invention is, however, not limited to this embodiment and may be applied to manufacture of a wide variety of electrical appliances, such as to the bonding of a substrate and a semiconductor chip.

Moreover, in the foregoing, the electrically conductive particles are dispersed into the adhesive. The present invention is, however, not limited to this embodiment and may be applied to such a case where the electrically conductive particles are not added to the adhesive.

The center metal of a metal chelate or a metal alcoholate may be enumerated by for example zirconium, titanium and aluminum. Of these, aluminum or titanium as a center atom is particularly preferred because of its high reactivity.

For sufficiently affixing particles 36 of the capsule resin to the surface of the core member 31, the average particle size of the capsule resin particle 36 is desirably smaller than the average particle size of the core member 31. As the resin forming the capsule resin particle, such a resin is preferably used, in which the melting point is equal to or higher than 30° C. and equal to or lower than 350° C., the thermal decomposition temperature is equal to or higher than 50° C. and equal to or lower than 500° C., the softening temperature is equal to or higher than 0° C. and equal to or lower than 300° C. and the glass transition temperature is equal to or higher than –40° C. and equal to or lower than 300° C.

There is no particular limitation to the sort of the resin used for the capsule resin particles 36, such that a variety of thermoplastic resins, cross-linked resins or gelated resins, satisfying the above conditions, may be used. Specifically, cross-linked acrylic resins, such as [Micro-Gel], a trade name of a product manufactured by NIPPON PAINT KK., a polymethyl methacrylate resin, such as [MP series], a trade name of a product manufactured by SOKEN KAGAKU KK., a fluorine resin, such as [Luburon], a trade name of a product manufactured by DAIKIN KOGYO KK., a benzoguanamine resin, such as [Eposter], a trade name of a product manufactured by NIPPON SHOKUBAI KK., or a silicone resin, such as [Tospar], a trade name of a product manufactured by CF TOSHIBA SILICONE KK., may be used.

In the foregoing, the case in which the epoxy resin is used as thermosetting resin added to the adhesive is explained. The present invention is, however, not limited to this embodiment, and a variety of resins that may undergo cationic polymerization, such as urea resin, melamine resin, phenolic resin, vinyl ether resin or oxyethane resins, may be used. However, the epoxy resins are preferably employed, in view of the adhesive strength following thermosetting.

As a silane coupling agent, used as an adhesive of the present invention, a compound represented by the following general formula (5):

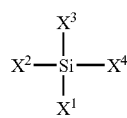

(5)

and, additionally, at least one of the substituents $X^1$ to $X^4$ other than the alkoxy group preferably has an epoxy ring or a vinyl group, may be used. As a substituent having the epoxy ring, a glycidyl group is particularly preferred.

As a thermoplastic resin, added to the adhesive, a wide variety of resins, other than the phenoxy resin, such as, for example, a polyester resin, a polyurethane resin, polyvinylacetal, ethylene vinyl acetate, or rubber, such as polybutadiene rubber, may be used. It is also possible to add an anti-ageing agent, a filler, or a colorant to the adhesive of the present invention.

The present invention is not limited to the embodiments described with reference to the drawings and, as may be apparent to those skilled in the art, various changes, substitutions or equivalents may be envisaged without departing from the scope and the purport of the invention as defined in the appended claims.

INDUSTRIAL APPLICABILITY

In the latent curing agent, according to the present invention, described above, the core member, containing a curing agent, is encapsulated, such that a silane coupling agent in the adhesive is not contacted with the curing agent at ambient temperature. Thus, the adhesive employing this curing agent exhibits superior preservability. When the adhesive, containing the latent curing agent, is pressured under heating, and the latent curing agent is cracked under thermal expansion or physical impact, the curing agent and the silane coupling agent are contacted with each other to yield cations. Due to these cations, the epoxy resin, forming the adhesive, undergoes cationic polymerization. Since the cationic polymerization proceeds at a lower temperature than in the polymerization reaction with the conventional adhesive, curing may proceed at a lower temperature and in a shorter time than in the conventional adhesive.

The invention claimed is:

1. A method for the preparation of an adhesive, comprising:
    a step of bonding a plurality of flocculated resin particles with one another, thereby forming a carrier;
    a step of forming a core member made up by the carrier and a curing agent; said carrier being chemically inert to said curing agent and having a gap in its inner structure, said curing agent made up by one or both of a metal chelate which is liquid at ambient temperature and a metal alcoholate which is liquid at ambient temperature, said carrier is immersed in said curing agent, said curing agent intruded into said gaps within said carrier and impregnates said carrier by a capillary phenomenon and is held in said carrier by capillary action;
    a step of rinsing said carrier after said step of forming said core member;
    a step of mixing said core member and a capsule resin agent having an average particle size smaller than a particle size of said core member to deposit said capsule resin agent on a surface of said core member electrostatically;
    a step of electrostatically depositing a capsule resin agent on the surface of said core member by mixing said core member and said capsule resin agent having an average particle size smaller than said particles of said core member;
    a step of forming a latent curing agent by stirring and fusing said capsule resin agent deposited on said core member to form a capsule covering said surface of said core member; and
    a step of manufacturing the adhesive by mixing and stirring said latent curing agent manufactured by said above process, a thermosetting resin, and a silane coupling agent.

2. The method according to claim 1, wherein said capsule resin agent forming said capsule has a melting point in the range of 30° C. to 350° C.

3. The method according to claim 1, wherein said capsule resin agent forming said capsule has a thermal decomposition temperature ranging from 50° C. to 500° C.

4. The method according to claim 1, wherein said capsule resin agent forming said capsule has a softening temperature ranging from 0° C. to 300° C.

5. The method according to claim 1, wherein said capsule resin agent forming said capsule has a glass transition temperature ranging from −40° C. to 300° C.

6. The method according to claim 1, wherein said metal chelate is one or both of an aluminum chelate or a titanium chelate, and said metal alcoholate is formed of one or both of an aluminum chelate or a titanium chelate as a main ingredient.

7. The method according to claim 6, wherein said thermosetting resin is an epoxy resin.

8. The method according to claim 7, wherein the step of manufacturing the adhesive further comprises mixing and stirring an electrically conductive particle.

9. The method according to claim 1, wherein the resin particles has an average particle size of equal to or greater than 0.1 μm and equal to or less than 1.0 μm and; and wherein the secondary particle has an average particle size of equal to or greater than 1 μm and equal to or less than 20 μm.

* * * * *